United States Patent Office 3,439,534
Patented Apr. 22, 1969

3,439,534
AUTOMOTIVE TESTING CENTER
Ollie P. Pilgrim, Kalamazoo, Mich., assignor to Allen Electric and Equipment Company, Kalamazoo, Mich., a corporation of Michigan
Filed Apr. 5, 1967, Ser. No. 628,734
Int. Cl. G01m 15/00, 17/00; G06f 1/00
U.S. Cl. 73—117                                3 Claims

ABSTRACT OF THE DISCLOSURE

An automotive diagnostic center including a linear path along which a series of stations are provided, each such station including testing equipment for diagnosing the condition of associated parts and functions of an automotive vehicle. A customer area extends along the diagnostic line whereby customers standing in the customer area can readily and fully view their vehicles when under test, the technician testing same and the equipment used to test the vehicle. Customer readout devices are provided in the customer area at each station. At least at one station, the customer readout may be a printed report indicating the test made, digital result of the test and a quantitative indication of whether the test outcome was satisfactory or unsatisfactory and whether the part tested has failed. The corresponding test equipment is preprogrammed to run a particular sequence of tests automatically, or step by step.

---

This invention relates to an automotive diagnostic center and more particularly relates to an automotive diagnostic center having at least one automated station on a line of testing stations and improved customer information reception.

The automotive diagnostic center is a comparatively recent development which has grown rapidly in popularity. Typically, an automotive diagnostic center will include a linear test path along which are distributed several stations, each station having test equipment for testing different functions of an automotive vehicle. The vehicle is generally moved intermittently along the line, stopping at each station for testing of one portion, e.g., the engine, the front suspension, and so forth. Such centers are highly advantageous since they generally allow relatively rapid testing of all the major functions of a vehicle at a relatively low cost and thus encourage motorists to periodically have their vehicles checked by such centers to determine faults before such faults become extensive enough to be expensive to fix or render the vehicle unsafe or unreliable.

These diagnostic centers are generally arranged as separate entities from servicing facilities and their only function normally is to provide a diagnosis of trouble rather than a cure. Thus, there is no disadvantageous dispersal of diagnostic facilities among various servicing facilities as would be found in conventional garages and dealership service facilities. Thus, these diagnostic centers or lines eliminate the prior problem in providing an over-all diagnosis of fault covering the entire vehicle, which problem was that the dispersal of the testing facilities in prior conventional garages made the complete testing of a vehicle both impractical and expensive. In addition, prior to the advent of diagnostic centers, consumer demand for complete diagnosis was generally relatively low, presumably because of its expense, that often complete and up-to-date diagnostiic facilities were not available in smaller garages and dealership service departments thus rendering a complete diagnosis impossible. It is believed that the present commercial success and rapid growth in number of diagnostic centers confirms their existence as a separate entity from the old fashioned integrated service and diagnosing garage or automobile dealership service department.

Known automotive diagnostic centers, however, still leave much to be desired, from the standpoints of efficiency and customer satisfaction. This is particularly true with respect to testing equipment provided at the engine testing station in existing diagnostic lines. Such equipment generally includes readout devices of the analog type, generally a maze of electric meters and cathode ray tubes.

Such readout devices are disadvantageous for several reasons. First, the displays provided by such devices normally fluctuate rapidly and are thus difficult to read accurately. A positive determination of values is also made difficult by the fact that the readout is an analog one rather than a digital one. Thus, accuracy often suffers.

In addition, information displayed in such a manner is generally incomprehensible and meaningless to the average customer of such an establishment so that there is little point in even showing such a display to a customer from the standpoint of his gaining any useful knowledge or feeling of confidence from it. Thus, even if the customer were allowed to stand beside the test technician in the testing station during testing and watch the instruments, the ordinary automobile owner would gain little or no knowledge of the condition of the vehicle without being continuously informed by the technician as testing progressed. This attention to the customer by the technician would greatly increase test costs and increase the chance of error or omission by diverting the operator's attention from his testing tasks.

The technician must be highly trained and very conscientious if the information displayed is to be reliably read and interpreted. However, highly trained personnel may be difficult to find and generally command high wages, thereby increasing the running expense of the center and thereby the cost to the customer of each diagnosis. In addition, the test technician normally manually records the readings of the display devices to provide a permanent record of the test and which may ultimately be incorporated in the report given the customer. This is a time consuming chore as well as a source of potential clerical error and takes time in which the technician could be doing other useful work, for example making and breaking test connections on the engine, changing instruments, selecting different tests and so forth, thus extending the time cost of each diagnosis.

In addition, the existing equipment is undesirable in that the tests must be manually selected, thus taking further time of the test technician and increasing the possibility of mistests and/or equipment incorrectly or incompletely set for particular ones of a series of tests carried out at the engine testing station.

Generally, after the testing at all stations on the line is completed, a report based on the analog readings observed by the technician must be submitted to the customer. This requires the test technician not only to have correctly read the analog readout but also to evaluate these readings by comparing them with published standards for the particular make and model vehicle in question and making judgments as to the presence or absence of a fault condition for each test in the test series performed. The technician then reports to the customer in a written report and/or in a conference, which takes additional operator time and delays his testing of further vehicles.

In addition, this report is generally the first comprehensible and qualitative indication the customer is given of parts needing repair or replacement.

Even if the customer had been able to see the testing being carried out, he would now need to recall what he saw at some time preceding in a given one of a large number of probably unfamiliar tests in order to correlate the testing that he had seen and the results in the report which he is given. Thus, it is virtually impossible for the customer, even if he is allowed to see the testing being carried out, to correlate what he saw with the report of the test with any completeness.

An automotive diagnostic center is particlarly vulnerable to lack of customer confidence. In the first place, the success of the diagnostic center in general, because it affords a new service, hinges on whether it can inspire and maintain public confidence. If it is to continue growing it must have the confidence of the public in order to convince the public of the desirability of periodic diagnostic testing. Diagnostic testing of automobiles cannot be said to be universally accepted by the public and before the advent of diagnostic centers was practiced only on the very narrowest of scales. Diagnosis of automotive faults has, at least on occasion and through experience with dishonest practitioners, inspired suspicion in a portion of the public with respect to the honesty of and motivation behind individual diagnoses of automotive ailments, particularly of diagnoses made out of the presence of the vehicle owner. Thus, it is believed important to the success of the individual diagnostic center and to the movement as a whole that the vehicle owner be exposed to every experience which will engender confidence in the validity of the diagnosis presented to him and to simultaneously expose him to each test, its results and their implications in a relatively complete form so that he can then make an affirmative judgment as to the validity of the test results and decide what, if anything, to do about the part tested.

As a result, it is an object of this invention to provide an automotive diagnostic center capable of carrying out a plurality of testing procedures comprising one or more testing stations through which automotive vehicles move successively for providing diagnostic information as to the operating condition of various parts thereof.

A further object is to provide an automotive diagnostic lane, as aforesaid, at least one station of which requires a substantially lowered level of skill for carrying through the sequence of tests and causing and providing a sensible written report to the customer.

A further object is to provide an automotive diagnostic line, as aforesaid, in which testing in at least one station is carried out automatically through a preprogrammed series of tests leaving the tester free to perform other tests including manual observation of parameters not readily tested by electronic devices presently known or available.

A further object is to provide an automotive diagnostic lane, as aforesaid, in which the customer is provided simultaneously with a view of the test area including the vehicle, the technician and the technician's apparatus as well as a written report on the outcome of each test simultaneously with the performances thereof.

A further object is to provide an automotive testing center, as aforesaid, in which the written report supplied to the customer includes not only a description of the test being carried out and numerical test data but a qualitative statement of whether the condition tested was satisfactory or unsatisfactory and whether failure of a part is indicated so that he may immediately on seeing the test performed make a final judgment as to whether or not he wishes a repair to be made to the area tested without the necessity of waiting until completion of all tests and without consulting the test technician.

It is a further object to provide an automotive diagnostic lane, as aforesaid, arranged to inspire a high level of customer confidence in the reliability of testing by elimination of manual conducting of a series of tests, the need for skilled perception of test equipment readouts and the need for skilled judgment is interpreting and comparing the test results and standards to determine whether a fault condition exists.

Further objects of this invention will be apparent to those acquainted with apparatus of this general type upon reading the following description and inspecting the accompanying drawings.

Figure 1:
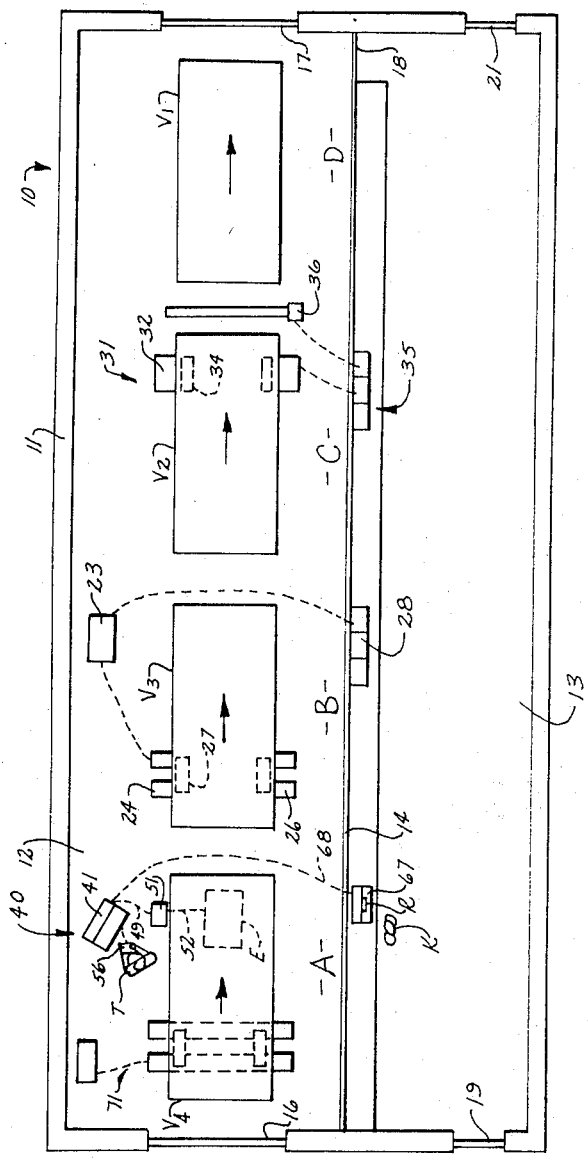
FIG. 1 is a plan view of an automotive diagnostic lane embodying the present invention.

Certain terminology will be used in the following description for purposes of convenience in reference and will not be limiting. The words "upwardly," "downwardly," "rightwardly" and "leftwardly" will refer to directions in the drawings to which reference is made. The words "inwardly" and "outwardly" will refer to directions toward and away from, respectively, the geometric center of the apparatus and parts thereof. The words "forwardly" and "rearwardly" will refer to the direction of normal vehicle flow through the diagnostic lane and to the opposite direction, respectively which are to the right and left, respectively, in FIG. 1. Said terminology will include the words above specifically mentioned, derivatives thereof and words of similar import.

GENERAL DESCRIPTION

In general, the objects and purposes of this invention are met by providing an automotive diagnostic center including a linear path along which a series of stations are provided, each such station including testing equipment for diagnosing the condition of associated parts and functions of an automotive vehicle. A customer area extends along the diagnostic line whereby customers standing in the customer area can readily and fully view their vehicles when under test, the technician testing same and the equipment used to test the vehicle. Customer readout devices are provided in the customer area at each station. At least at one station, the customer readout may be a printed report indicating the test made, digital result of the test and a quantitative indication of whether the test outcome was satisfactory or unsatisfactory and whether the part tested has failed. The corresponding test equipment is preprogrammed to run a particular sequence of tests automatically, or step by step.

DETAILED DESCRIPTION

Generally, the automotive diagnostic center 10 embodying the invention is preferably housed in a building 11 and is divided into two elongated areas which extend side-by-side, these areas being the diagnostic line 12 and the customer area 13. The diagnostic and customer areas 12 and 13 are preferably separated by a transparent wall 14 so that customers may view their vehicles being tested. An entrance 16 is provided at the leftward end of the diagnostic center includes four stations A, B, C and D disward end thereof for allowing automotive vehicles to enter and exit therefrom. The one or more doors 18 are provided between the diagnostic and customer areas and suitable entrances 19 and 21 are provided for the customer area. In the particular embodiment shown, the diagnostic center includes four stations A, B, C and D distributed along the length of the diagnostic lane 12. Vehicles V1, V2, V3 and V4 are normally distributed along the line and normally are disposed at corresponding stations, being successively moved from station to station for testing. The flow of vehicles is to the right as indicated by the arrows.

The sequence of testing operations may be chosen as desired and may vary widely. However, in the particular embodiment here chosen to illustrate the invention, engine testing is carried out at station A in a manner hereinafter described and braking systems are checked at station B.

Station B is also preferably provided with a chassis dynamometer, the control portion of which is indicated generally at 23. The chassis dynamometer includes rolls 24 and 26 engaging the rear wheels, indicated in broken lines at 27, of the vehicle V3. The rolls 24 and 26 are powered in any conventional manner, not shown, in response to appropriate actuation of the control 23. The rolls are alternatively engageable by the rear wheels and front wheels of vehicle V3 and allow the vehicle brakes to be tested under simulated road conditions. Suitable readout means are included in the control 23 for indicating to a technician the status of the brakes and corresponding customer readout means 28 are provided in the customer area at station B so that the owner of the vehicle V3 may observe the condition of his brakes. The chassis dynamometer 23 may be of any conventional type and more particularly may be as diclosed in Patent No. 3,020,753 to Maxwell. The readout instruments may simply be tachometers indicating the wheel or roller speed in a conventional manner. If desired, of course, the chassis dynamometer 23 may also be used simply to measure the power output of the vehicle engine taken at the rear wheels of the vehicle at various speeds. If desired, the transmission shift points may be recorded on an oscilloscope, recorder or tape to denote engine r.p.m. vs. road speed.

Station C includes a wheel alignment device 31 including apparatus 32 engaging the front wheels indicated in broken lines at 34 of the vehicle V2. This wheel alignment machine 31 may be of any convenient type, an example of which is that of Patent No. 2,702,432 to Martin. In addition, station C is here provided with a headlight aligning device 36 which again may be of any conventional type.

Station D is the final station in the line at which the vehicle V1 is returned to its owner. Suitable readout means 35, which may simply be alarms actuated by a technician as a result of poor wheel alignment or misaligned headlights are located in the customer area 13.

If desired, the readout of instruments 28 and 35 may be of type generally described hereinafter with respect to the corresponding customer readout for station A.

Turning to the equipment at station A in more detail, same includes a comparator system 40 (FIGURES 1 and 2) including a comparator console 41 which is disposed in the diagnostic area 12 beside the vehicle V4. The comparator console includes a digital readout panel 42 visible to the test technician. A similar readout may be provided in the customer lounge in conjunction with the technicians display. The digital readout 42 provides a measure of the test results for each of a series of tests carried out on the engine E of the vehicle V4. Use of a digital rather than an analog readout as previously generally done lessens the chance for error in passing test results on to the test technician and considerably lowers the skill level required of the test technician for reading test results.

The comparator console further includes a qualitative readout portion 43 on which are alternatively displayable qualitative statements of the condition of the portion of the part of the vehicle being tested at a given instant, designations such as "high," "low," "fail," "replace" and so forth or words of similar type being used to indicate without need for technician judgment the state of the part or system tested. The qualitative readout may be accomplished by any convenient means such as providing lamps behind words printed on a glass sheet covering at least the portion 43 and igniting the lamps corresponding to the word desired and it may further include automatic printout means 67 of known sort for making a permanent record of the test results.

The console face further includes a plurality of lamps 44 arranged in a line each corresponding to one of the cylinders of the vehicle engine under test ignition of lamps indicating whether the cylinders are firing properly.

The console further includes input slots 46 and 47 for program and comparison standard cards $P_p$ and $P_1$, respectively, which cards are preferably "but not necessarily" conventional, punched IBM cards. The program card $P_p$ is insertable in the console on a step-wise fashion either by automatic induction by the comparator console itself or as a result of actuation of a suitable push button 48 on the console. A further button 48A is actuable for back spacing to enable repeating of a test. The data punched into the program card at each location along its length sets the comparator for carrying out a particular individual test on the engine E such as finding the no-load battery voltage, the condition of the output of the battery under load, the point resistance, the coil primary resistance and so forth for a potentially large number of tests required. The standard card $P_1$ is punched with limit data for each test to which the actual test results are compared as hereinafter discussed to determine whether or not the part or system parameter tested is satisfactory.

Further push buttons generally indicated at 50 may be provided if desired for initiating special tests which are not covered by the program card.

The console 41 connects to an adapter unit 51 through a cable 49. The adapter 51 in turn connects through suitable subcables or conductors 52 to points on the engine E to be tested as well as to various conventional servo devices such as indicated generally at S for setting parts of the engine in different positions of operation to enable tests to be carried out under a variety of engine conditions. In addition, the adaptor 51 includes external manually actuable controls, here a starter button 53 and stop switch 54, actuable respectively for starting the engine and for stopping same, for example, for setting the breaker points to an open or closed condition. The adapter 51 is substantially smaller than the console 41 and may be disposed adjacent the vehicle being tested, for example, on the fender adjacent the engine, on wheels or suspended from a swivel wall mount or an overhead track. It is contemplated that an adaptor additionally provide test signals of various types to the engine. For example, it preferably simulates a charged battery for voltage regulator adjustment, provides shunt action for cranking control in generator or alternator output tests. It preferably further provides a capacitor high voltage pick-off which allows the engine to operate with the ignition system capacitor disconnected. It preferably provides an independent source for distributor breaker point coil resistance measurements as well. The adaptor preferably is arranged to open the engine coil primary circuit to allow capacitor and coil tests. Still further, the adaptor is arranged to serve as a junction box for additional equipment such as timing lights, combustion analyzers transducers and so forth. The adaptor may include suitable conventional means for conditioning data fed from the engine to the comparator console.

In addition, the comparator system 40 includes a manual input device 56 including a clip board 57 adapted to be held in the hands of the technician during testing of the vehicle V4. The clip board is adapted to carry suitable forms upon which the test technician may make notes with respect to the data appearing on the readout portions 42, 43 and 44 of the console or may use to check off various tests as they are made or any other similar purpose. The clip board also includes a manual input head 58 provided with a plurality of manually actuable push button switches 59, 61 and 62 by actuation of which the test technician indicates the condition of various parts of the vehicle which cannot be readily electrically inspected. The push buttons 59, 61 and 62 may, for example, be labeled "good," "marginal" or "fail," respectively, the test technician actuating the appropriate buttons as he inspects fan belts, tail lights, tires and the like. The data punched into the control head switches 59, 61 and 62 is fed to the console through a suitable connecting cable 66.

The customer printout device 67 is preferably disposed in the customer area opposite station A at the window 14 so that the customer K may watch the test being conducted and immediately thereafter or concurrently therewith receive a printed record from the printout device 67. The printout device 67 may be of any convenient conventional types, such as solenoid operated punch, and may be energized by a cable 68 connected to the comparator cosole 41, or remotely controlled by means of wireless transmission. Thus, the printout device 67 preferably prints out on a form the digital test data and the qualitative result, both of which are displayed as above discussed by the readout 42, 43 and 44 on the console 41. The form is preferably preprinted with the tests being carried out. Thus, the customer sees the test being carried out and essentially at the same time is provided a printed report including digitized test data and a qualitative statement of condition. The customer can immediately evaluate the data and impressions which he receives and can therefore immediately make a judgment as to whether or not he wishes or needs to have repairs made on the particular item tested and can do so with a high level of confidence in the correctness and honesty of the test results furnished him. In addition, he is not confused with analog readings or various other forms of data which may be generally incomprehensible to him.

Preferably, station A also includes a chassis dynamometer indicated at 71 which may be of any convenient type and may, for example, be similar to that employed at station B. Such dynamometer is preferably supplied for loading the rear wheels of the vehicle at station A as needed for effective testing purposes.

Figure 2:
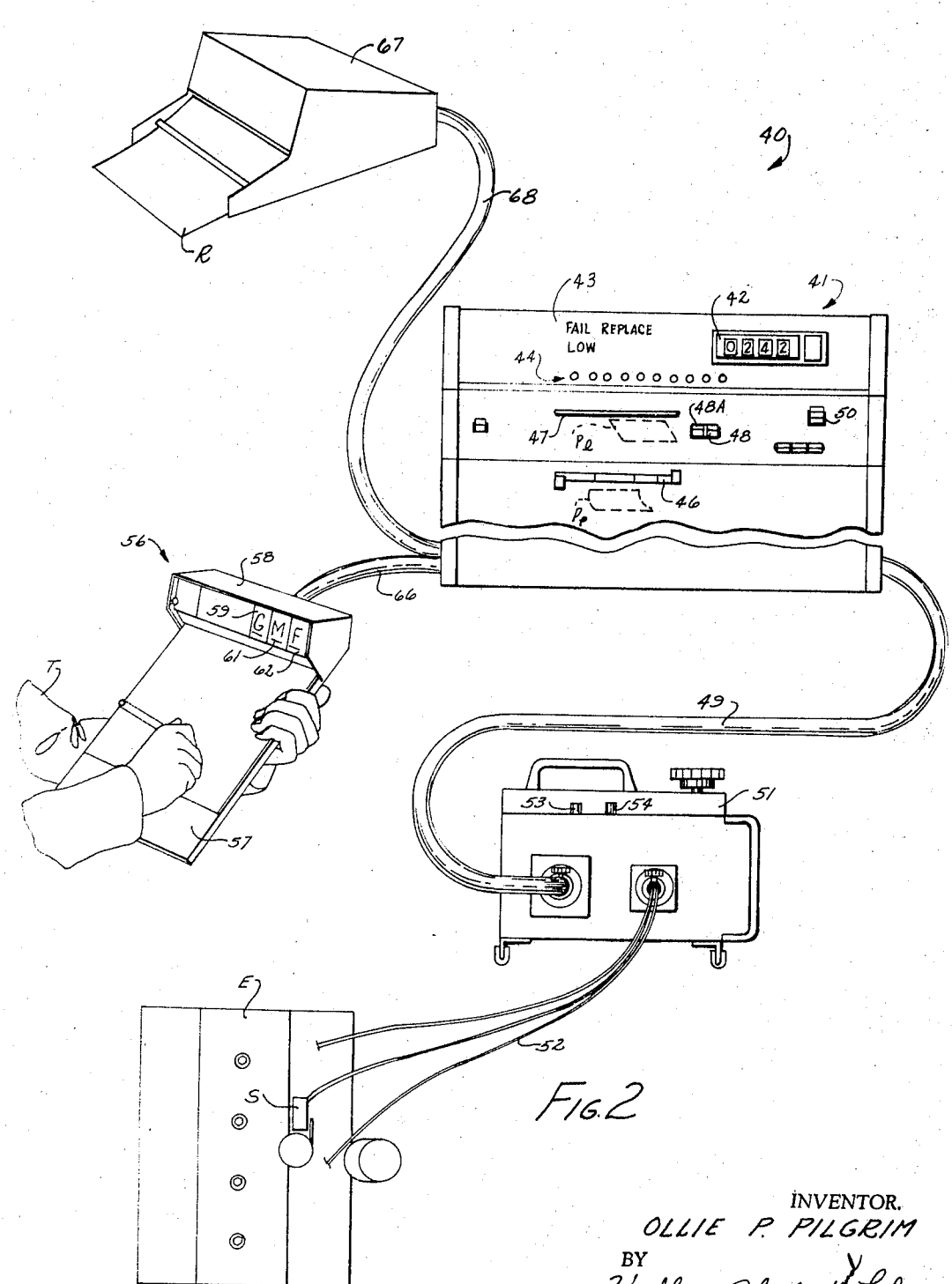
FIG. 2 is a diagrammatic view of apparatus associated with one of the stations of the diagnostic line of FIG. 1.
Figure 3:
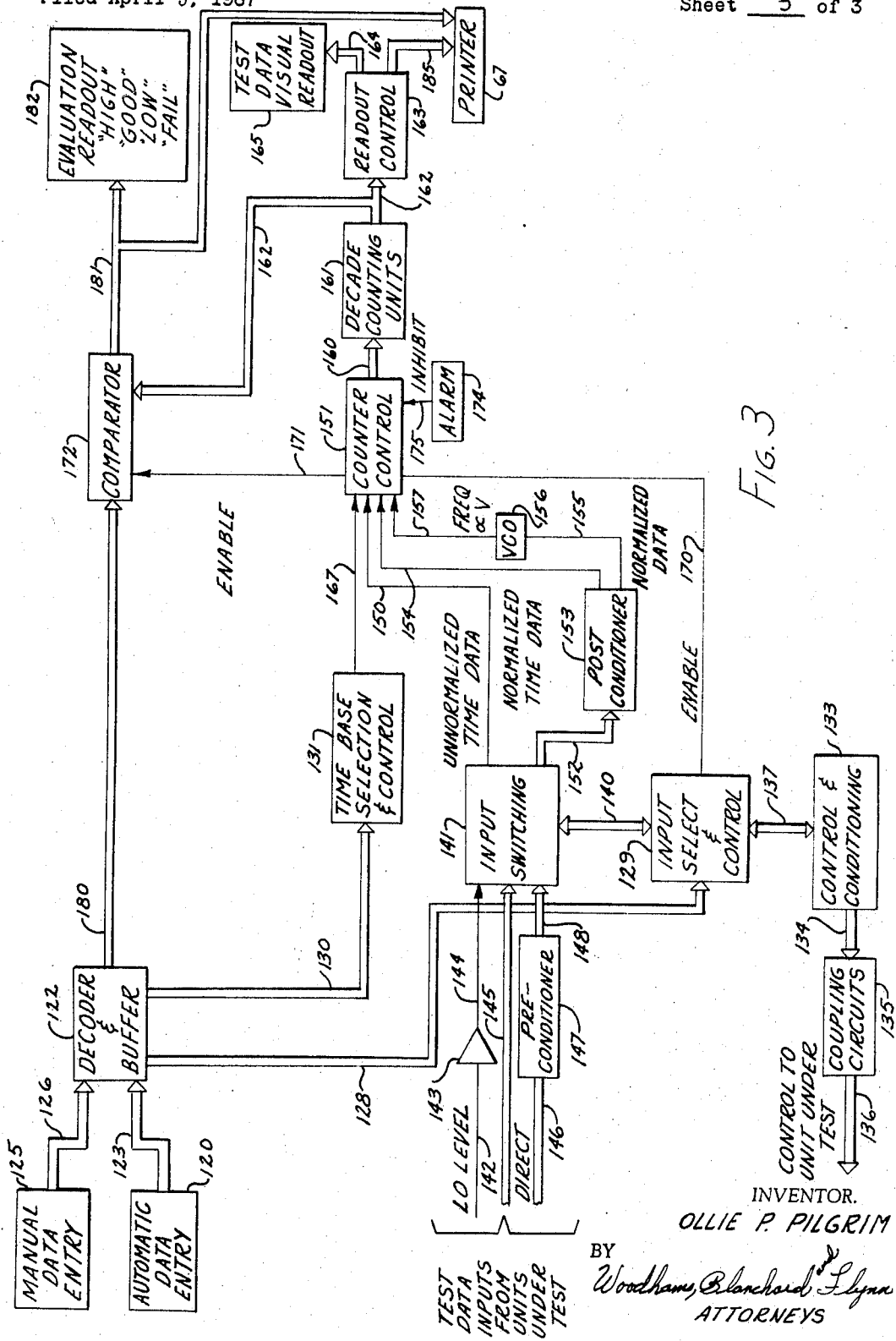
FIG. 3 is a block diagram of the equipment disclosed in in FIG. 2.

FIGURE 3 is a block diagram which discloses the block layout of the comparator system shown in FIGURE 2 and corresponds, except as noted, to a comparator disclosed in patent application Ser. No. 487,861 by Muller and Whittle, assigned to the assignee of the present invention and filed Sept. 16, 1965, and now abandoned. Although the similar portions of the drawings are explained in substantially greater detail in the above application, same will be briefly reviewed at this point to a clearer idea of the operation of the apparatus of the present invention. Thus, the comparator system indicated in FIGURE 3 includes an automatic data entry portion indicated at 120 for translating the data punched in the program and data cards inserted in slot 46 and 47 into electrical signals applied by line 123 to a decoder and buffer circuit 122. The automatic data entry device 120 preferably includes conventional means, not shown, for advancing the program and data cards simultaneously to maintain program information and standard data relating to a particular test in proper correspondence during the testing sequence.

The unit also includes a manual data entry section 125 which includes the manual input device 56 described above with respect to FIGURE 2. The manual data entry portion 125 connects through line 126 to the decoder buffer 122 above mentioned. The decoder and buffer circuit 122 acts as a buffer between the data entry devices 120 and 125 and the rest of the circuit. The decoder and buffer circuit receives coded information from the entry circuits 120 and 125 regarding the engine settings and equipment settings and limit data test to be performed together with manual input data to be displayed. The circuit 122 includes conventional logic circuitry for routing bits or groups of the information received thereby to appropriate succeeding circuits.

An output of the decoder and buffer 122 connects through a line 128 to an input select and control circuit 129 which then selects and applies appropriate actuating signals through one of a plurality of lines, one of which is indicated at 137, to the proper one of several control and conditioning circuits 133. The particular control and conditioning circuit selected is coupled through a line 134 and coupling circuits 135 and a line 136, here housed in the cable 49, to control the portion of the vehicle under test. In this way, the engine may be caused to vary in its operation, for example, by changing speed or fuel-air mixture by means of transducers coupled to the carburetor to provide the required engine condition for the particular test to be performed.

The input select and control circuit 129 has a further output through a line 140 to an input switching circuit 141. The input switching circuit 141 has a number of inputs from the vehicle under test. These inputs may be of several types, and include, for example, low level lines 142 each of which connects through an amplifier 143 and line 144 to the input switching circuit 141 for picking up relatively low voltage signals. On the other hand, certain inputs from the vehicle engine and its accessories such as battery voltage, starter current and the like may be measured directly through lines 145 connected to the input of the input switching circuit 141. Further signals may require conditioning of one kind or another and are applied through lines 146, suitable preconditioner circuits 147 and lines 148 to the input switching circuit 141. Such preconditioners may be used to change pulse shapes, to generate pulses upon sensing changes in voltage or other parameters and changing voltage levels. Thus, on receiving a signal from the input select and control circuit 129, the input switching circuit 141 chooses the appropriate test data input or inputs from the vehicle. The input signals selected may pass directly through a line 150 to a countercontrol circuit 151. Alternatively, the selected signal may be transmitted through a line 152 to a post conditioning circuit 153, the output of which is in turn taken either directly through line 154 to the countercontrol 151 or as a further alternative through a line 155, a voltage controlled oscillator having an alternating output proportional in frequency to the voltage fed thereinto and a line 157 to the countercontrol 151. The post conditioner and the voltage controlled oscillator circuit provide any further modification of the input signal needed to cause the information carried thereby to be a function of the frequency of the signal fed into the countercontrol.

The above-mentioned decoder and buffer circuit 122 has a further output 130 to a time base selection and control circuit 131 to provide a time base signal in a line 167 to the countercontrol 151. The particular time base chosen by the time base selection and circuit 131 depends upon the input to the decoder and buffer circuit 122 and thus is appropriate to the test desired to be made. The output of the countercontrol is taken through line 160 to a decade counting unit 161 which in turn connects through line 162 to a readout control 163 and test data visual readout 165 corresponding to the readouts 42, 43 and 44 of FIGURE 2. The countercontrol 151, decade counting unit 151, readout control 163 and readout 165 essentially comprise a conventional digital counter. Output is also taken from the readout control 163 through a line 185 to a printer corresponding to printer 67 shown in FIGURE 2.

After counting is complete in a particular test, the countercontrol unit 151 supplies signals through lines 170 and 171 to the input selector control circuit 129 and to a comparator circuit 172, respectively, which signals allow the latter to commence operation at the proper time. An alarm device 174 is responsive to any of a variety of error conditions which might occur, such as improper insertion of a program card into the machine, is arranged to inhibit the countercontrol 151 by passing a signal thereto through a line 175 in the event of such a fault condition.

The comparator circuit 172 receives an input from the decoder and buffer circuit 122 through a line 180 which corresponds to the acceptable limits of the readout from the decade counting units for the particular test at hand. In addition, the comparator circuit has an input through line 162 from the output of the decade counting unit 161. The comparator 172 compares the limit input from the decoder and buffer 22 to the actual test data from the decade counting units 161 to determine whether or not the digitized test data falls within acceptable limits. Depending on the placement of the digitized test data in relation to the limits established for the test, the comparator actuates the printer 67 and an evaluation readout device 182 through line 181 to qualitatively indicate whether or not the digitized information is high, good, low or whether the tested portion of the vehicle has failed. It will be apparent, however, that any convenient or desired words can be used in the place of those just mentioned. The manual data entry is already in condition to generate a qualitative output and is passed directly through the decoder 122, line 180 comparator 172 and line 181 to the evaluation readout device 82 and printer 67. This then is the qualitative output of the system 40 as it appears at 43 on the face of the console in FIGURE 2 and in the printed output of the printer 67 in the customer area.

OPERATION

The detailed operation of the circuitry indicated in FIGURE 3 is largely set forth in the above mentioned application and is not of direct concern in the present application. The operation of the present invention has been indicated broadly above but will briefly be summarized to insure a complete understanding of the invention.

Thus, turning to FIGURE 1, vehicles proceed sequentially and intermittently along the diagnostic line 12 to the right as indicated by the arrows. Station A is the engine testing station and the vehicle 4 is stopped with its drive wheels on the rolls of the chassis dynamometer 71. The test technician connects the subcables 52 by means of any convenient connectors and/or transducers to selected points on the engine in a conventional fashion. A program card P_p is fed by the test technician into the slot 46 and a limit card P_1 is fed into the slot 47 on the console 41, the cards then being fed into the machine step by step either automatically or by manual actuation of the button 48. The cards are read by the automatic data entry circuit 120 and the tests indicated are performed in sequence, the correct operating conditions of the engines being automatically set by the control and conditioning units 133, for each test and the resulting data from each test being digitized by the apparatus of FIGURE 3 and compared to the limit data from the card P_1.

Thus, for each test in the series the digital test result readout is supplied to the window 42 on the console and is printed out by the printer 67 on a report sheet R so that the customer K in the customer area 13 is provided with the digitized data in printed form for each test as it is performed. The qualitative readout for each test appears on the panel 43 as well as in the customer's printout indicating whether or not the condition of the portion of the vehicle checked is satisfactory or unsatisfactory or whether replacement is required. At the end of each test in the sequence at station A, the customer has a printed report at hand covering the condition of the portion of the engine just checked or the condition a manually inspected portion of the vehicle the latter being fed into the console 41 by the switches 59, 61 and 62 on the clipboard 57.

Thereafter, the vehicle V4 is passed into the succeeding stations B, C, and D of the diagnostic line for testing of brakes, wheel alignment and so forth.

Although a particular preferred embodiment of the invention has been disclosed above for illustrative purposes, it will be apparent that modifications and variations thereof lying within the scope of the appended claims are fully contemplated.

The embodiments of the invention in which an exclusive property or privilege is claimed are defined as follows:

1. In an automotive testing center of the type having a plurality of testing stations distributed along a line, spaced for a vehicle at each of said stations and means for testing different portions of a vehicle at each of said stations, the combination comprising:
   a customer area adjoining said paths and provided with means allowing the customer a view of his vehicle as it is being tested at each of said stations;
   testing means for comparing test data obtained from the vehicle undergoing tests to standards of acceptable test results to determine a qualitative statement disclosing the state of the part being tested, said means including a digitizing device for digitizing test data and providing a digitized readout viewable by the test technician conducting the testing;
   means connecting the testing means to the vehicle for receiving test signals therefrom;
   printout means located opposite said testing means in said customer area and viewable and accessible to the customer as he watches the tests being conducted on his vehicle for producing a printed record of the test results as each test on the vehicle is terminated;
   whereby the customer simultaneously views his vehicle undergoing test and is provided with the resulting test data to allow his immediate decision as to the state of the part tested.

2. The device defined in claim 1 in which said means connectible to points on said vehicle includes means for starting, increasing and decreasing engine r.p.m. and stopping said engine for actuation by the test technician and in which said manual data input means comprises a clipboard having a plurality of switches mounted thereon actuable by the test technician to indicate whether manually inspected portions of the vehicle are satisfactory or require replacement.

3. In an automotive testing center including an elongated linear path along which a series of closely spaced, longitudinally aligned automotive vehicles may be moved in an intermittent fashion, each of said vehicles including an engine, drive wheels and transmission means for drivingly connecting said engine to said drive wheels, said testing center further having a plurality of testing stations distributed in spaced relation along said path so that one vehicle is normally at each station and so that said vehicles may be advanced successively through said stations, each of said stations being provided with test equipment for testing at least one parameter of performance of said vehicle while said vehicle is at said station, the test equipment provided and the parameters checked at each station differing from those of the remaining ones of said stations, the combination comprising:
   a customer area located beside and extending along said path where persons associated with said vehicles may stay while their vehicles are being tested, each testing station being provided with a window to said customer area to allow customers to view their vehicles undergoing testing;
   means at one of said stations for engaging the drive wheels of the vehicle thereat, said wheel engaging means being capable of energization by said drive wheels and having loading means associated therewith adjustable for impeding the rotation of said drive wheels to a preselectable extent for loading the vehicle engine driving said wheels;
   means connectible to points on the engine of the vehicle at said one station for providing signals regarding engine performance parameters while said engine is driving said drive wheels against preselected loads applied by said wheel-engaging means and for controlling the operation of said engine;
   a comparator console connected to said engine connectible means and sequential programming means associated with said console for determining the test sequence to be followed, said console further including means for comparing said signals with standards fixed for the type and model of vehicle being tested to provide an indication of the quality of the portion of the vehicle being tested at a given instant;

manual data input means connected to said console and responsive to actuation by the test technician for providing data based on observation by said operator to said analyzer regarding the condition of parts of the vehicle, the condition of said parts not being readily detected by nonhuman sensors;

display means on said console fed by said comparison means and said connections to said engine for indicating test conditions, data results and quality results for each test as it is performed;

printout means located opposite said one station in said customer area and connected to said console for producing a printed record for each test performed, qualitative test results and an indication of when repair is recommended;

whereby the customer simultaneously views his vehicle undergoing the test and is provided with a printed record of the results of that test and such occurs for each of a series of tests.

References Cited

UNITED STATES PATENTS

| | | | |
|---|---|---|---|
| 3,238,772 | 3/1966 | Pellicciotti | 73—117 |
| 3,304,768 | 2/1967 | Naumann et al. | 73—90 |
| 3,354,707 | 11/1967 | Born | 73—117 |

RICHARD C. QUEISSER, *Primary Examiner.*

JERRY W. MYRACLE, *Assistant Examiner.*

U.S. Cl. X.R.

235—61.7